March 29, 1949.    O. H. BANKER    2,465,832
CHANGE-SPEED TRANSMISSION
Filed May 31, 1947    2 Sheets-Sheet 1

INVENTOR.
Oscar H. Banker
BY

Patented Mar. 29, 1949

2,465,832

UNITED STATES PATENT OFFICE 2,465,832

CHANGE-SPEED TRANSMISSION

Oscar H. Banker, Evanston, Ill., assignor to New Products Corporation, Chicago, Ill., a corporation of Delaware Application May 31, 1947, Serial No. 751,533

15 Claims. (Cl. 74—327)

1

The invention relates to a change-speed transmission and more particularly to a transmission and driving mechanism for use in tractors or the like. Still more specifically the invention relates to a change-speed transmission for an industrial tractor of the type used in warehousing, loading, unloading, etc.

In a vehicle of the type mentioned above it is desirable to secure a relatively high powered tractor having a low center of gravity and being relatively easily maneuverable. Many of these desirable results flow from a construction in which the vehicle is relatively small in size, so that it may be easily handled. In order that the desirable high power can be obtained it is necessary that the driving mechanism and power train connections therefor be sturdy in construction and compact in design and that the change-speed mechanism be relatively simple in operation and yet permitting wide flexibility in speed ratios, both in forward and reverse.

It is a principal object of the present invention to provide a change-speed transmission particularly adapted for use in a vehicle of the type referred to above. It is an important object of the invention to provide a transmission of compact and sturdy construction and having relatively few moving parts. Still other objects of the invention are: to associate such transmission with the final driving mechanism for the vehicle, in such manner that the desirable low center of gravity is obtained and further so that the transmission of torque to the traction wheels of the vehicle proceeds through relatively short power lines; and to embody in the transmission suitable drive gearing so arranged as to consume as little space as possible.

The foregoing and other important objects and desirable features of the invention are set forth in greater detail in the following description of a preferred embodiment of the invention as shown in the accompanying sheets of drawings in which:

Fig. 3 is a fragmentary longitudinal sectional view showing another form of the invention in which the change-speed transmission is associated with a modified form of final drive mechanism.

Figure 1:
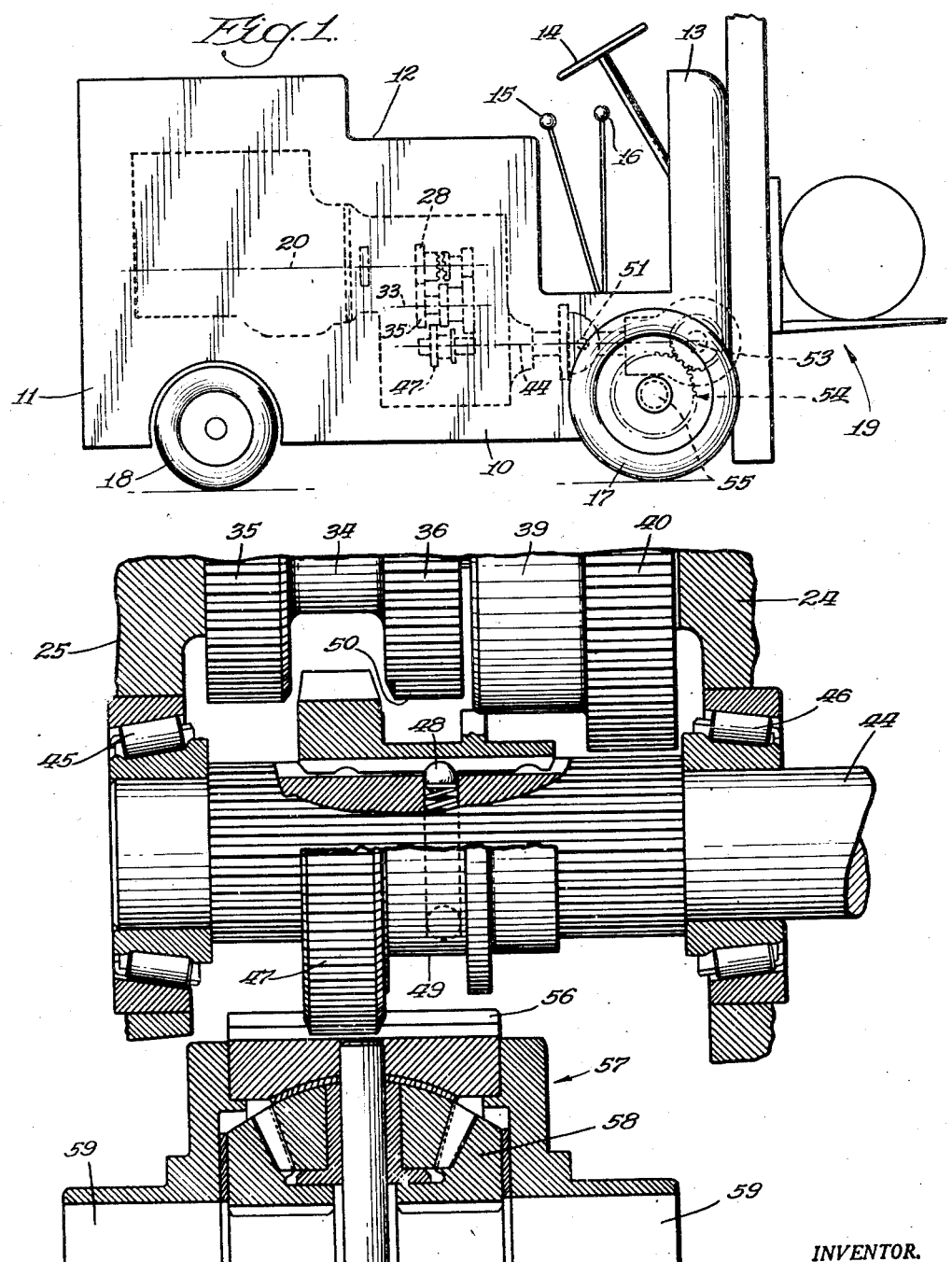
Fig. 1 is a side elevational view of an industrial tractor embodying one form of the invention, the transmission and power train being shown in broken lines.

As shown in Fig. 1, the tractor may include a

2 main frame 10 having a rear body portion 11 including an operator's station 12 and a forward body portion 13 between which and the operator's station 12 are located a steering control mechanism including a wheel 14, and a pair of transmission control levers 15 and 16. The frame 10 is supported on front traction wheels 17 and rear steerable wheels 18. The forward portion of the frame may be associated in the usual manner with a liftable carrying structure designated generally by the numeral 19.

The vehicle may be equipped with any suitable source of power such as an internal combustion engine which supplies power to a driving shaft 20. The shaft 20 is carried adjacent one end in an antifriction bearing 21 and is further journaled at its other end in an antifriction bearing 22. The bearings 21 and 22 are in turn carried by spaced walls 23 and 24 respectively of a transmission housing 25 included in the vehicle frame.

The shaft 20 carries for rotation therewith, adjacent the wall 24, a low speed driving pinion 26. This pinion is preferably formed integrally with the shaft 20 and the portion of the shaft adjacent the pinion is reduced as at 27 for piloting in the bearing 22. Journaled on the shaft 20 adjacent the transmission wall 23 is a high speed driving gear 28 having a hub portion 29 provided as one component of a disengageable driving means including jaw clutch elements 30 engageable with and disengageable from jaw clutch elements 31 on a collar 32 that is keyed or splined to the shaft 20 for axial shifting thereon. When the clutch elements 30 and 31 are engaged, the gear 28 will be driven by the shaft 20.

The transmission 25 includes a second or countershaft 33 fixed at its opposite ends in the walls 23 and 24. This shaft journals thereon a rotatable driven element in the form of a gear cluster 34 which includes a relatively larger gear 35, a smaller gear 36 and a coaxial hub portion 37. The gear 35 is in constant mesh with the gear 28 on the shaft 20. The hub portion 37 provides part of an overrunning clutch including rollers 38 engageable between the hub portion 37 and an annular sleeve 39 of a driven gear 40. The gear 40 is provided with a generally cup-like recess, the outer annular wall of which is formed by the sleeve portion 39. The rollers 38 (only one of which is shown) may be held in circumferentially spaced apart relation by a cage structure 41. The gear 40 is in constant mesh with the pinion 26 on the shaft 20 and is journaled on the countershaft 33 by needle bearings 42. The gear cluster 34 is likewise journaled on the shaft 33 by needle bearings 43.

It will be noted from the description thus far that the transmission walls 23 and 24 are relatively closely spaced apart and that the drive gearing thus far described is located entirely between these walls, being compactly arranged therein. The disposition and arrangement of the gear cluster 34 with respect to the gears 26 and 28 on the shaft 20 is such that the smaller gear 36 of the cluster is positioned substantially centrally between the walls 23 and 24 and substantially vertically below the jaw clutch elements 30 and 31.

The transmission further includes an output shaft 44 journaled at one end by an antifriction bearing 45 in the transmission wall 23. A second bearing 46 in the wall 24 journals a portion of the shaft 44 axially spaced from the first journaled portion. The shaft 44 carries for rotation therewith and for axial shifting thereon a driven gear 47. The shaft 44 may be splined or the gear 47 may be keyed to accomplish the arrangement set forth. The shaft 44 is provided intermediate its ends with a diametrically extending bore within which is carried a spring-pressed detent 48 engageable with any one of three notches or recesses formed on the inside diameter of the gear 47. The detent mechanism serves to hold the gear 47 in any one of its shifted positions on the shaft 44, the shifting being accomplished by means of the control lever 15 (Fig. 1) and suitable control mechanism (not shown) connected to a collar 49 formed on an integral hub extension of the gear.

The gear 47 may be shifted to the left to mesh with the gear 35 of the gear cluster 34; or to the right in mesh with a reverse idler 50 rotatable on an axis behind and parallel to the axis of the countershaft 33. The gear 50 is in constant mesh with the smaller gear 36 of the gear cluster 34. In the drawings the gear is shown as in its "neutral" position.

The other control lever 16 is operatively connected to the collar 32 of the jaw clutch 30—31, which connection may be accomplished by any suitable mechanism (not shown).

Figure 2:
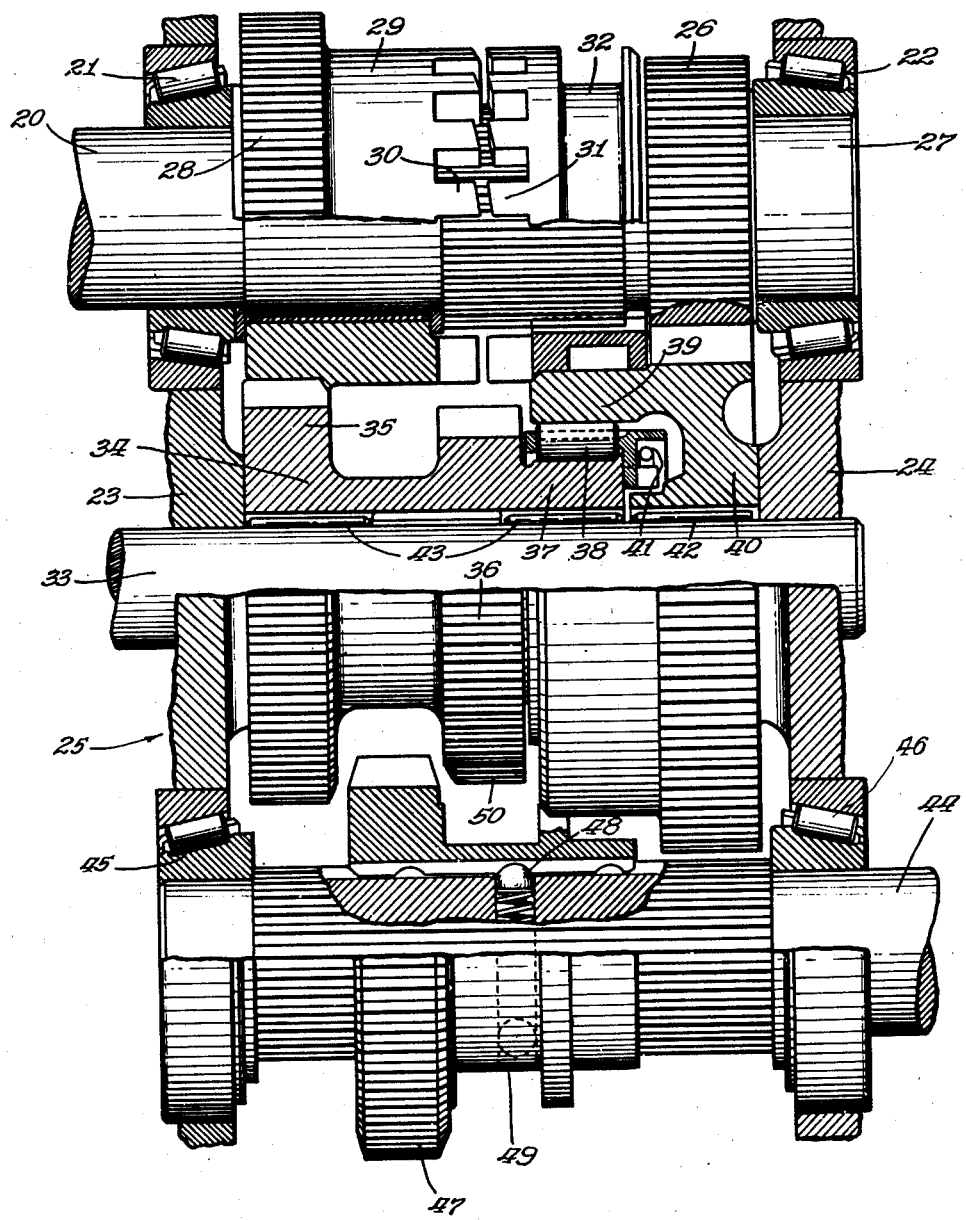
Fig. 2 is a longitudinal sectional view through the transmission of Fig. 1.

The operation of the transmission just described is as follows: With the parts in the position shown in Fig. 2, the transmission is in neutral. When the control lever 16 is shifted in one direction the jaw clutch 30—31 is disengaged. Power transmitted to the shaft 20 will flow through the pinion 26 to the driven gear 40 on the shaft 33, the larger gear 28 on the shaft 20 being freely rotatable with respect to the shaft. The transmission will now be in its "low" range. The driven gear 40 will, through the overrunning clutch 37—38—39, drive the gear cluster 34. Although the larger gear 35 of the cluster will drive the "high range" gear 28 on the shaft 20, there will be no interference with operation of the transmission in low range, since the gear 28 is journaled on the shaft 20.

According to the position of the shiftable gear 47 on the output shaft 44, the output shaft will be driven either forwardly or in reverse or will not be driven at all. When the gear 47 occupies the position shown in the drawings, no power will be transmitted to the output shaft and the "forward—reverse" control lever 15 will be in its neutral position. When the lever 15 is shifted in one direction, the gear 47 will be shifted, for example to the left and in mesh with the larger gear 35 on the gear cluster 34, whereupon the output shaft will be driven forwardly in low range. When the lever 15 is shifted in the opposite direction, the gear 47 will be shifted into mesh with the reverse idler 50, whereupon the output shaft 44 will be driven in the reverse direction in low range.

The transmission may also be operated in either forward or reverse in high range. This result is accomplished by moving the control lever 16 so that the jaw clutch elements 30 and 31 are engaged. The shaft 20 will then drive the high range gear 28. This gear will thereupon drive the gear 35 of the gear cluster 34. Because of the interposition of the overrunning clutch 37—38—39, the gear cluster 34 can overrun the gear 40. The gears 35 and 36 are now driven in a higher speed range than before and shifting of the gear 47 on the output shaft 44 into mesh with either the gear 35 or the reverse idler 50 will drive the output shaft in either "forward" or "reverse" in such higher speed range.

As shown in Fig. 1, the output shaft 44 extends longitudinally of the vehicle frame and may be connected by a universal joint 51 to the vehicle final drive mechanism. This mechanism may include a pair of transverse, differentially-connected drive shafts 53 (only one of which is shown) which in turn are connected through suitable reduction gearing 54 to short shafts 55 (only one of which is shown) on which each of the drive wheels 17 is mounted.

The form of the invention shown in Fig. 3 is adapted for use in vehicles in which the transmission 25 is disposed transversely rather than longitudinally of the vehicle. In this case the output shaft 44 is connected by means of the gear 47 to a ring gear 56 forming part of a differential mechanism generally indicated at 57. The differential mechanism may include conventional differential gearing 58 which in turn is connected in the usual manner to a pair of drive axles 59, one extending laterally at each side of the differential mechanism. The face of the ring gear 56 is of such width that the gear 47 remains in constant mesh therewith regardless of whether the gear 47 is in "neutral," "forward" or "reverse." In the use of this type of transmission in a vehicle of the class set forth, the same desirable results of compactness, high power and low center of gravity are achieved.

The foregoing has set forth two preferred embodiments of the invention in substantial detail. It is not desired, however, that this detailed description delineate the applicability of the invention, since many modifications and alterations may be made in the preferred forms illustrated and described without departing from the spirit and scope of the invention as set forth in the appended claims.

What is claimed is:

1. In a change-speed transmission: an input shaft; an intermediate rotatable element including first and second coaxial, conjointly rotatable gears; means for driving the intermediate element from the input shaft in one speed ratio, comprising a pair of engageable and disengageable clutch elements on the input shaft, one of which is keyed to the input shaft and the other of which includes a gear in constant mesh with the aforesaid first gear; means for driving the intermediate element from the input shaft in another speed ratio, comprising an overrunning clutch having a pair of cooperating members, one of which is connected to the intermediate element and the other of which is constantly driven by the input shaft; an output shaft; and means for driving the output shaft from the intermediate rotatable element in either of two directions, comprising a "reverse" idler in constant mesh with the aforesaid second gear, and a gear keyed to and axially shiftable on the output shaft into mesh with either the "reverse" idler or the aforesaid first gear.

2. In a change-speed transmission: an input shaft; an intermediate rotatable element including first and second coaxial, conjointly rotatable gears; means for driving the intermediate element from the input shaft in one speed ratio, comprising a pair of engageable and disengageable clutch elements, one of which is connected for rotation with the input shaft and the other of which is connected for rotation with the intermediate element; means for driving the intermediate element from the input shaft in another speed ratio, comprising an overrunning clutch having a pair of cooperating members one of which is connected for rotation with the intermediate element and the other of which is connected for rotation by the input shaft; an output shaft; and means for driving the output shaft from the intermediate rotatable element in either of two directions, comprising a "reverse" idler driven by the intermediate element, a "forward" gear driven by the intermediate element, and a gear keyed to and axially shiftable on the output shaft into mesh with either the "reverse" idler or the "forward" gear.

3. In a change-speed transmission as set forth in claim 2, in which: drive mechanism is associated with the output shaft and includes a rotatable gear having portions engageable by the shiftable gear regardless of whether said shiftable gear meshes with the "forward" gear or the "reverse" idler.

4. In a change-speed transmission as set forth in claim 3, in which: the drive mechanism includes a differential, the rotatable gear is a ring gear having a face of sufficient width to remain in constant mesh with the shiftable gear, whether said shiftable gear meshes with the "forward" gear or the "reverse" idler.

5. A change-speed transmission, comprising: a housing having spaced apart walls; (a) a rotatable input shaft extending between and journaled in said walls; (b) a high speed driving gear rotatably carried on (a) adjacent one wall and including (c) a clutch element; (d) a low speed driving gear rotatable with (a) and located adjacent the other of the walls; means for connecting (b) to (a) for rotation therewith including (e) a clutch element keyed to (a) and positioned between (c) and (d) and shiftable on (a) into and out of engagement with (c); (f) a countershaft paralleling (a) and carried by the walls; (g) a rotatable low speed gear on (f) in constant mesh with (d); a rotatable gear cluster on (f) including (h) a "forward" gear and (i) a reversing gear, (h) and (i) being spaced coaxially apart but connected for rotation together, (h) being in constant mesh with (b); means including an overrunning clutch for driving the gear cluster from (g); a reverse idler gear rotatable in the housing on an axis paralleling (f) and in constant mesh with (i); (k) an output shaft paralleling (f) and carried by the walls; and (l) a gear carried by (k) for rotation therewith but axially shiftable thereon from a "neutral" position intermediate (h) and (j) to either a "forward" position in mesh with (h) or a "reverse" position in mesh with (j).

6. A change-speed transmission, comprising: (a) a rotatable input shaft; (b) a high speed driving gear rotatably carried on (a) and including (c) a clutch element; (d) a low speed driving gear rotatable with (a); means for connecting (b) to (a) for rotation therewith including (e) a clutch element keyed to (a) and positioned between (c) and (d) and shiftable on (a) into and out of engagement with (c); (f) a countershaft paralleling (a); (g) a rotatable low speed gear on (f) in constant mesh with (d); a rotatable gear cluster on (f) including (h) a "forward" gear and (i) a reversing gear, (h) and (i) being spaced coaxially apart but conjointly rotatable, (h) being in constant mesh with (b); means including an overrunning clutch for driving the gear cluster from (g); a rotatable reverse idler gear on an axis paralleling (f) and in constant mesh with (i); (k) an output shaft paralleling (f); and (l) a gear carried by (k) for rotation therewith but axially shiftable thereon from a "neutral" position intermediate (h) and (j) to either a "forward" position in mesh with (h) or a "reverse" position in mesh with (j).

7. A change-speed transmission as set forth in claim 6, in which: (m) a fourth shaft parallels (k); and (n) a drive gear is connected to (m) for rotation therewith and includes a face sufficiently wide to be in constant mesh with (l) regardless of whether (l) is in "neutral," "forward" or "reverse."

8. A change-speed transmission as set forth in claim 6, in which: a driving structure is rotatable on an axis paralleling (k) and comprises a differential mechanism having a ring gear provided with a face of sufficient width to be in constant mesh with (l) whether (l) is in "neutral," "forward" or "reverse."

9. A driving mechanism for vehicles or the like, comprising; a driven element; means for driving the driven element in either of two speed ratios; an output shaft; means for driving the output shaft from the driven element in either of two directions, including a "reverse" idler rotatable by the driven element, a "forward" gear rotatable with the driven element, and a gear keyed to the output shaft and axially shiftable thereon into mesh with either the "reverse" idler or the "forward" gear; and final drive means including a differential mechanism having a ring gear in meshing relation with the shiftable gear and of a width for maintaining such meshing relation during shifting of said shiftable gear.

10. A driving mechanism for vehicles or the like, comprising: a driven element; means for driving the driven element; an output shaft; means for driving the output shaft from the driven element in either of two directions, including a "reverse" idler connected with the driven element to rotate synchronously therewith, a "forward" gear rotatable with the driven element, and a gear keyed to the output shaft and axially shiftable thereon into mesh with either the "reverse" idler or the "forward" gear; and final drive means including a differential mechanism having a ring gear in meshing relation with the shiftable gear and of a width capable of maintaining such meshing relation during shifting of said shiftable gear.

11. In a change-speed transmission: a first rotatable shaft including a pinion rotatable therewith; a gear rotatable on the shaft in axially spaced relation to the pinion and including a hub having a jaw clutch element facing toward the pinion; a second jaw clutch element keyed to the shaft and axially shiftable thereon toward and away from the first clutch element for engagement with and disengagement from the first element; a second shaft paralleling the first shaft; a rotatable gear cluster on the second shaft including a relatively larger gear in constant mesh with the first shaft gear, a relatively smaller gear, and an integral hub portion; means including a gear rotatable on the second shaft, being in constant mesh with the first shaft pinion, and having an integral, coaxial cup-like extension encircling the hub of the gear cluster; means providing an overrunning clutch between said hub and cup-like extension; a third shaft; and means for selectively driving the third shaft from the gears on the gear cluster.

12. In a change-speed transmission: a rotatable shaft including a pinion rotatable therewith; a gear rotatable on the shaft in axially spaced relation to the pinion and including a hub having a clutch element; a second clutch element keyed to the shaft and axially shiftable thereon for engagement with and disengagement from the first element; a gear cluster rotatable on an axis paralleling the shaft and including a relatively larger gear in constant mesh with the shaft gear, a relatively smaller gear, and a conjointly rotatable hub portion; means including a rotatable gear coaxial with the gear cluster, in constant mesh with the first shaft pinion, and having a coaxial annular extension encircling the hub of the gear cluster; means providing an overrunning clutch between said hub and extension; an output shaft; and means for selectively driving the output shaft from the gears on the gear cluster.

13. In a change-speed transmission: a rotatable shaft carrying a pinion for rotation therewith; a gear journaled on the shaft in axially spaced relation to the pinion and including a hub having a clutch element; a second clutch element keyed to the shaft and axially shiftable thereon for engagement with and disengagement from the first element; a gear cluster rotatable on an axis paralleling the shaft and including a relatively larger gear in constant mesh with the shaft gear, a relatively smaller gear, and a conjointly rotatable hub portion; means including a rotatable gear coaxial with the gear cluster, in constant mesh with the pinion, and having a coaxial annular extension encircling the hub of the gear cluster; means providing an overrunning clutch between said hub and extension; a reverse idler meshing with the smaller gear on the gear cluster; and rotatable means including a shiftable element engageable with either the reverse idler or the larger gear of the gear cluster.

14. In a change-speed transmission: a shaft; first and second coaxially spaced apart gears on the shaft; means journaling the first gear on the shaft; means fixing the second gear to the shaft for rotation with the shaft; a disengageable clutch on the shaft between the gears including a first element rotatable with the first gear and a second element rotatable with the shaft; means rotatable on an axis paralleling the shaft and including a pair of conjointly rotatable coaxial gears of different diameters and a gear rotatable independently of said pair of gears and spaced coaxially therefrom, one of the gears of the pair being in constant mesh with the aforesaid first gear and the independently rotatable gear being in constant mesh with the aforesaid second gear; means in the space between the pair of gears and the independently rotatable gear and including an overrunning clutch having components mobilizable to establish driving relation between the independently rotatable gear and one of the gears of the pair; and rotatable means optionally connectible with either of the gears of the pair.

15. In a change-speed transmission: a shaft; first and second coaxially spaced apart gears on the shaft; means journaling the first gear on the shaft; means fixing the second gear to the shaft for rotation with the shaft; a disengageable clutch on the shaft between the gears including a first element rotatable with the first gear and a second element rotatable with the shaft; means rotatable on an axis paralleling the shaft and including first and second conjointly rotatable coaxial gears of different diameters and a gear rotatable independently of said pair of gears and spaced coaxially therefrom, the first gear of the pair being in constant mesh with the aforesaid first gear and the independently rotatable gear being in constant mesh with the first mentioned second gear; means in the space between the pair of gears and the independently rotatable gear and including an overrunning clutch having components mobilizable to establish driving relation between the independently rotatable gear and the second gear of the pair; and means including a reverse idler in constant mesh with the second gear of the pair, and a shiftable rotatable member optionally engageable with either the reverse idler or the second gear of the pair.

OSCAR H. BANKER.

REFERENCES CITED

The following references are of record in the file of this patent:

UNITED STATES PATENTS

| Number | Name | Date |
|---|---|---|
| 1,885,413 | Cappa | Nov. 1, 1932 |
| 2,203,282 | Keese | June 4, 1940 |
| 2,320,575 | Sinclair | June 1, 1943 |

FOREIGN PATENTS

| Number | Country | Date |
|---|---|---|
| 501,498 | Great Britain | Feb. 28, 1939 |